(12) United States Patent
Melton et al.

(10) Patent No.: US 9,563,334 B2
(45) Date of Patent: Feb. 7, 2017

(54) METHOD FOR PRESENTING DOCUMENTS USING A READING LIST PANEL

(71) Applicant: Apple Inc., Cupertino, CA (US)

(72) Inventors: Donald D. Melton, San Carlos, CA (US); Darin B. Adler, Los Gatos, CA (US); Alice Liu, Sunnyvale, CA (US); Kevin W. Decker, San Jose, CA (US); Brady K. Eidson, Sunnyvale, CA (US); Gavin Barraclough, Mountain View, CA (US); Steven J. Falkenburg, Los Altos, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/052,759

(22) Filed: Feb. 24, 2016

(65) Prior Publication Data

US 2016/0170587 A1    Jun. 16, 2016

Related U.S. Application Data

(63) Continuation of application No. 14/642,372, filed on Mar. 9, 2015, now Pat. No. 9,310,969, which is a
(Continued)

(51) Int. Cl.
*G06F 3/0482* (2013.01)
*G06F 17/21* (2006.01)
(Continued)

(52) U.S. Cl.
CPC ......... *G06F 3/0482* (2013.01); *G06F 3/04817* (2013.01); *G06F 3/04842* (2013.01);
(Continued)

(58) Field of Classification Search
CPC .............. G06F 3/0482; G06F 17/30719; G06F 17/2247
(Continued)

(56) References Cited

U.S. PATENT DOCUMENTS

| 6,300,947 B1 | 10/2001 | Kanevsky |
| 6,542,173 B1 | 4/2003 | Buckley |

(Continued)

FOREIGN PATENT DOCUMENTS

| CN | 1403964 A | 3/2003 |
| CN | 101977233 A | 2/2011 |
| WO | WO 9926172 A1 | 5/1999 |

OTHER PUBLICATIONS

Ma, et al., "A Framework for Adaptive Content Delivery in Heterogeneous Network Environments," Hewlett-Packard Laboratories, Palo Alto, CA, Feb. 3, 2005, 15 pages.
(Continued)

*Primary Examiner* — Andrea Leggett
(74) *Attorney, Agent, or Firm* — Morgan, Lewis & Bockius LLP

(57) ABSTRACT

A reading list panel is displayed as a sidebar window with respect to a main window of a content viewing application. In response to a first input, a first article representation of a first article associated with a presentation page displayed in the main window is listed in the reading list panel, where the first article representation includes information identifying the first article. In response to a selection of a second article representation from the reading list panel, content of a second article represented by the second article representation is presented in a reader mode within the main window.

32 Claims, 9 Drawing Sheets

Related U.S. Application Data continuation of application No. 13/192,218, filed on Jul. 27, 2011, now Pat. No. 8,977,947.

(60) Provisional application No. 61/493,276, filed on Jun. 3, 2011.

(51) Int. Cl.

| | | |
|---|---|---|
| *G06T 13/80* | (2011.01) | |
| *G06F 3/0481* | (2013.01) | |
| *G06F 17/27* | (2006.01) | |
| *G09G 5/12* | (2006.01) | |
| *G06F 3/0484* | (2013.01) | |
| *G06F 17/22* | (2006.01) | |
| *G06F 17/30* | (2006.01) | |

(52) U.S. Cl.
CPC ........ *G06F 17/211* (2013.01); *G06F 17/2235* (2013.01); *G06F 17/2247* (2013.01); *G06F 17/2288* (2013.01); *G06F 17/27* (2013.01); *G06F 17/30719* (2013.01); *G06F 17/30905* (2013.01); *G06T 13/80* (2013.01); *G09G 5/12* (2013.01)

(58) Field of Classification Search
USPC .................................. 715/739, 804
See application file for complete search history.

(56) References Cited

U.S. PATENT DOCUMENTS

| | | |
|---|---|---|
| 6,788,316 B1 | 9/2004 | Ma et al. |
| 7,159,011 B1 | 1/2007 | Knight et al. |
| 7,512,905 B1 | 3/2009 | Scott |
| 7,647,550 B1 | 1/2010 | Nguyen |
| 8,156,419 B2 | 4/2012 | Choudhary et al. |
| 8,977,947 B2 | 3/2015 | Melton et al. |
| 2002/0077900 A1 | 6/2002 | Thompson et al. |
| 2002/0093505 A1 | 7/2002 | Hill et al. |
| 2004/0019611 A1 | 1/2004 | Pearse et al. |
| 2004/0049541 A1 | 3/2004 | Swahn |
| 2004/0049737 A1 | 3/2004 | Simon Hunt et al. |
| 2004/0078453 A1 | 4/2004 | Bhogal et al. |
| 2004/0128618 A1 | 7/2004 | Datta |
| 2004/0148571 A1 | 7/2004 | Lue |
| 2004/0191746 A1 | 9/2004 | Maron et al. |
| 2004/0254913 A1 | 12/2004 | Bernstein et al. |
| 2005/0027788 A1 | 2/2005 | Koopmans et al. |
| 2005/0097458 A1 | 5/2005 | Wilson |
| 2005/0222965 A1 | 10/2005 | Chaudhuri et al. |
| 2006/0036955 A1 | 2/2006 | Baudisch et al. |
| 2006/0230355 A1 | 10/2006 | Nurmi |
| 2007/0073777 A1 | 3/2007 | Werwath et al. |
| 2007/0124666 A1 | 5/2007 | Sauve et al. |
| 2007/0150484 A1 | 6/2007 | Funge et al. |
| 2007/0157104 A1 | 7/2007 | Blain et al. |
| 2007/0186182 A1 | 8/2007 | Schiller |
| 2008/0168388 A1 | 7/2008 | Decker |
| 2008/0195936 A1 | 8/2008 | White et al. |
| 2008/0275890 A1 | 11/2008 | Chakrabarti et al. |
| 2008/0275901 A1 | 11/2008 | Chakrabarti et al. |
| 2008/0281827 A1 | 11/2008 | Wang et al. |
| 2008/0295019 A1* | 11/2008 | Han .................. G06F 3/0485 715/781 |
| 2008/0307301 A1 | 12/2008 | Decker et al. |
| 2008/0307328 A1 | 12/2008 | Hatcher et al. |
| 2009/0024962 A1* | 1/2009 | Gotz ................ G06F 17/30884 715/838 |
| 2009/0046584 A1 | 2/2009 | Garcia et al. |
| 2009/0051692 A1 | 2/2009 | Gralley |
| 2009/0094546 A1 | 4/2009 | Anzelde et al. |
| 2009/0164883 A1* | 6/2009 | Decker ............... G06F 17/3089 715/234 |
| 2009/0222720 A1 | 9/2009 | Drieschner |
| 2009/0248707 A1 | 10/2009 | Mehta et al. |
| 2009/0254850 A1 | 10/2009 | Almeida |
| 2009/0262094 A1 | 10/2009 | Lin |
| 2009/0319342 A1 | 12/2009 | Shilman et al. |
| 2010/0053644 A1 | 3/2010 | French et al. |
| 2010/0095219 A1 | 4/2010 | Stachowiak et al. |
| 2010/0115388 A1 | 5/2010 | Nguyen |
| 2010/0115408 A1 | 5/2010 | Mujkic et al. |
| 2010/0162139 A1 | 6/2010 | Beebe et al. |
| 2010/0205523 A1 | 8/2010 | Lehota et al. |
| 2010/0235321 A1 | 9/2010 | Shukla et al. |
| 2010/0299620 A1 | 11/2010 | Sharma et al. |
| 2010/0313159 A1 | 12/2010 | Decker et al. |
| 2011/0078615 A1 | 3/2011 | Bier |
| 2011/0099294 A1 | 4/2011 | Kapur et al. |
| 2011/0119571 A1 | 5/2011 | Decker et al. |
| 2011/0242610 A1 | 10/2011 | Fan et al. |
| 2011/0302510 A1 | 12/2011 | Harrison et al. |
| 2011/0302524 A1 | 12/2011 | Forstall |
| 2012/0011428 A1 | 1/2012 | Chisholm |
| 2012/0230555 A1 | 9/2012 | Miura et al. |
| 2014/0026034 A1 | 1/2014 | Harrison et al. |
| 2015/0234553 A1 | 8/2015 | Melton et al. |

OTHER PUBLICATIONS

Office Action dated Dec. 19, 2013, received in U.S. Appl. No. 13/192,218, 18 pages.

Final Office Action dated Jul. 29, 2014, received in U.S. Appl. No. 13/192,218, 18 pages.

Notice of Allowance dated Oct. 30, 2014, received in U.S. Appl. No. 13/192,218, 7 pages.

Office Action dated Feb. 17, 2015, received in Australian Patent Application No. 2012262885, which corresponds to U.S. Appl. No. 13/192,218, 3 pages.

Notice of Allowance, dated Oct. 8, 2015, received Australian Patent Application No. 2012262885, which corresponds to U.S. Appl. No. 13/192,218, 2 pages.

Certificate of Grant, dated Feb. 4, 2016, received Australian Patent Application No. 2012262885, which corresponds to U.S. Appl. No. 13/192,218, 1 page.

Notice of Allowance dated Sep. 1, 2015, received in U.S. Appl. No. 14/642,372, 10 pages.

Notice of Allowance dated Dec. 23, 2015, received in U.S. Appl. No. 14/642,372, 10 pages.

Examiner's Amendment, dated Feb. 19, 2016, received in U.S. Appl. No. 14/642,372, 5 pages.

International Search Report and Written Opinion for International PCT Application No. PCT/US2012/037756, mailed Oct. 31, 2012, 15 pages.

International Preliminary Report on Patentability dated Dec. 4, 2013, received in International Patent Application No. PCT/US2012/037756, which corresponds to U.S. Appl. No. 13/192,218, 10 pages.

Prasad et al., "CoreEx: Content Extraction from Online News Articles," Stanford University, Stanford, CA, Dec. 10, 2008, 2 pages.

Rahman, "Content Extraction from HTML Documents," Document Analysis and Recognition Team (DART), BCL Computers Inc., Santa Clara, CA, Jul. 5, 2001, 4 pages.

Readability-An Arc90 Lab Experiment, Jun. 4, 2010, 2 pages.

Screenshot of readability feature developed by Arc90Lab, Published on Dec. 2009, 2 pages.

Office Action, dated May 3, 2016, received in Chinese Patent Application No. 201280027139.4, which corresponds with U.S. Appl. No. 13/192,218, 2 pages.

Office Action, dated Oct. 2, 2012, received in U.S. Appl. No. 13/154,394, 13 pages.

Final Office Action, dated Jan. 29, 2013, received in U.S. Appl. No. 13/154,394, 15 pages.

Notice of Allowance, dated Feb. 13, 2014, received in U.S. Appl. No. 13/154,394, 12 pages.

Office Action, dated Jan. 15, 2013, received in U.S. Appl. No. 12/794,674, 21 pages.

(56) References Cited

OTHER PUBLICATIONS

Notice of Allowance, dated Jun. 7, 2013, received in U.S. Appl. No. 12/794,674, 19 pages.
Office Action, dated Mar. 3, 2015, received in U.S. Appl. No. 14/018,218, 14 pages.
Final Office Action, dated Aug. 12, 2015, received in U.S. Appl. No. 14/018,218, 12 pages.
Notice of Allowance, dated Feb. 1, 2016, received in U.S. Appl. No. 14/018,218, 12 pages.

* cited by examiner

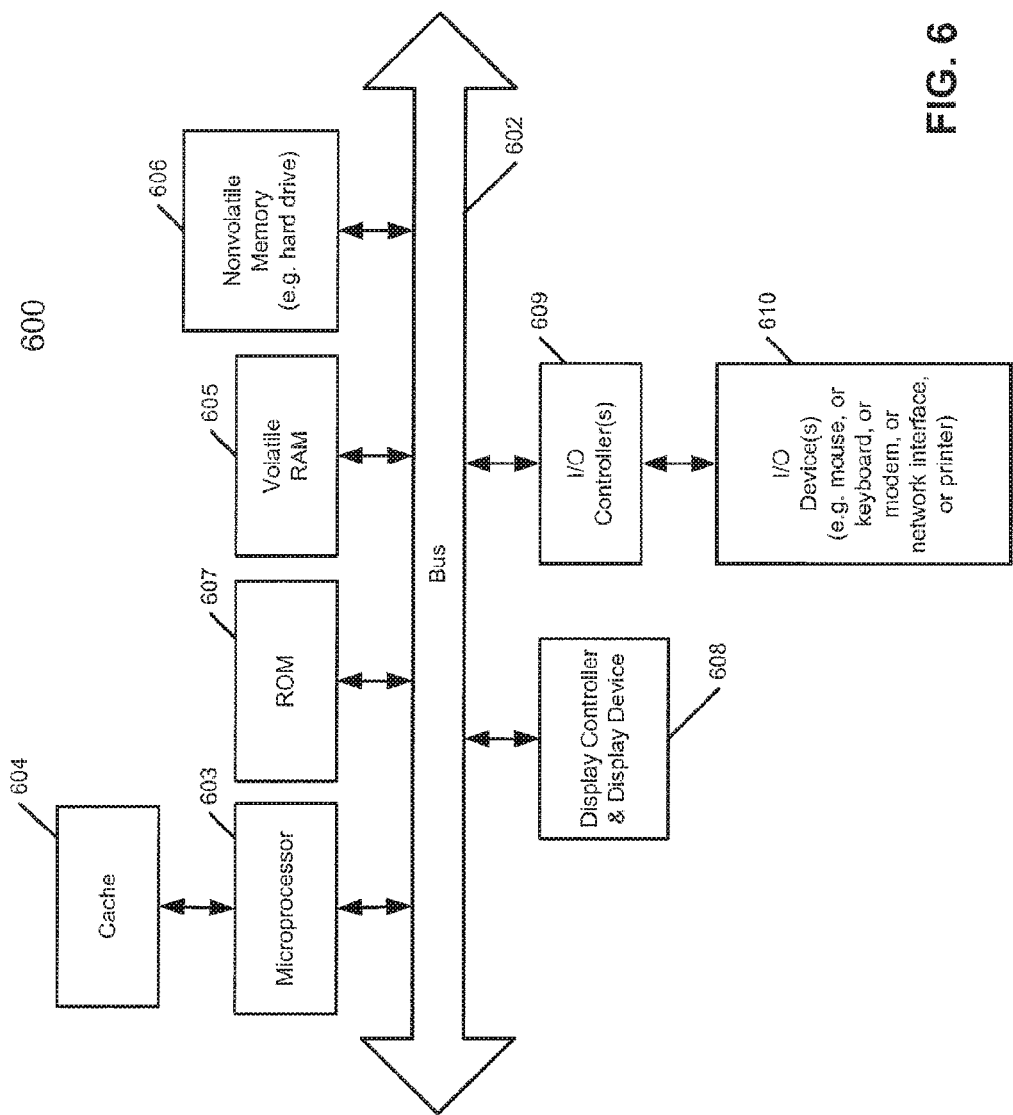

METHOD FOR PRESENTING DOCUMENTS USING A READING LIST PANEL

RELATED APPLICATIONS

This application is a continuation of U.S. application Ser. No. 14/642,372, filed Mar. 9, 2015, which is a continuation of U.S. application Ser. No. 13/192,218, filed Jul. 27, 2011, now U.S. Pat. No. 8,977,947, which claims the benefit of U.S. Provisional Patent Application No. 61/493,276, filed Jun. 3, 2011, all of which are incorporated by reference in their entireties.

FIELD OF THE INVENTION

Embodiments of the present invention relate generally to user interface. More particularly, embodiments of the invention relate to a reading list panel to store a list of documents that can be presented in a reader mode.

BACKGROUND

With the fast advance of browser technologies and World Wide Web infrastructures, more and more content or applications are accessed via a browser. However, most Web documents are designed to carry a variety of content elements for multiple purposes. Often times, a user interested in a portion of content or an interactive application can be presented with myriads of information of no interest to the user at all. It is not unusual for a browser user to be distracted by navigation controls, user interface controls of a Web document, advertising, marketing, or promotional campaign from a Web document while trying to focus only on the interested portion of content.

Therefore, accessing content included in Web documents via traditional browsers do not provide users with smooth, focused and friendly experiences.

BRIEF DESCRIPTION OF THE DRAWINGS

Embodiments of the invention are illustrated by way of example and not limitation in the figures of the accompanying drawings in which like references indicate similar elements.

FIGS. 2A-2D are screenshots illustrating an example of graphical user interfaces of a content viewing application according to some embodiments of the invention.

FIG. 6 is a block diagram of a data processing system, which may be used with one embodiment of the invention.

DETAILED DESCRIPTION

Figure 1:
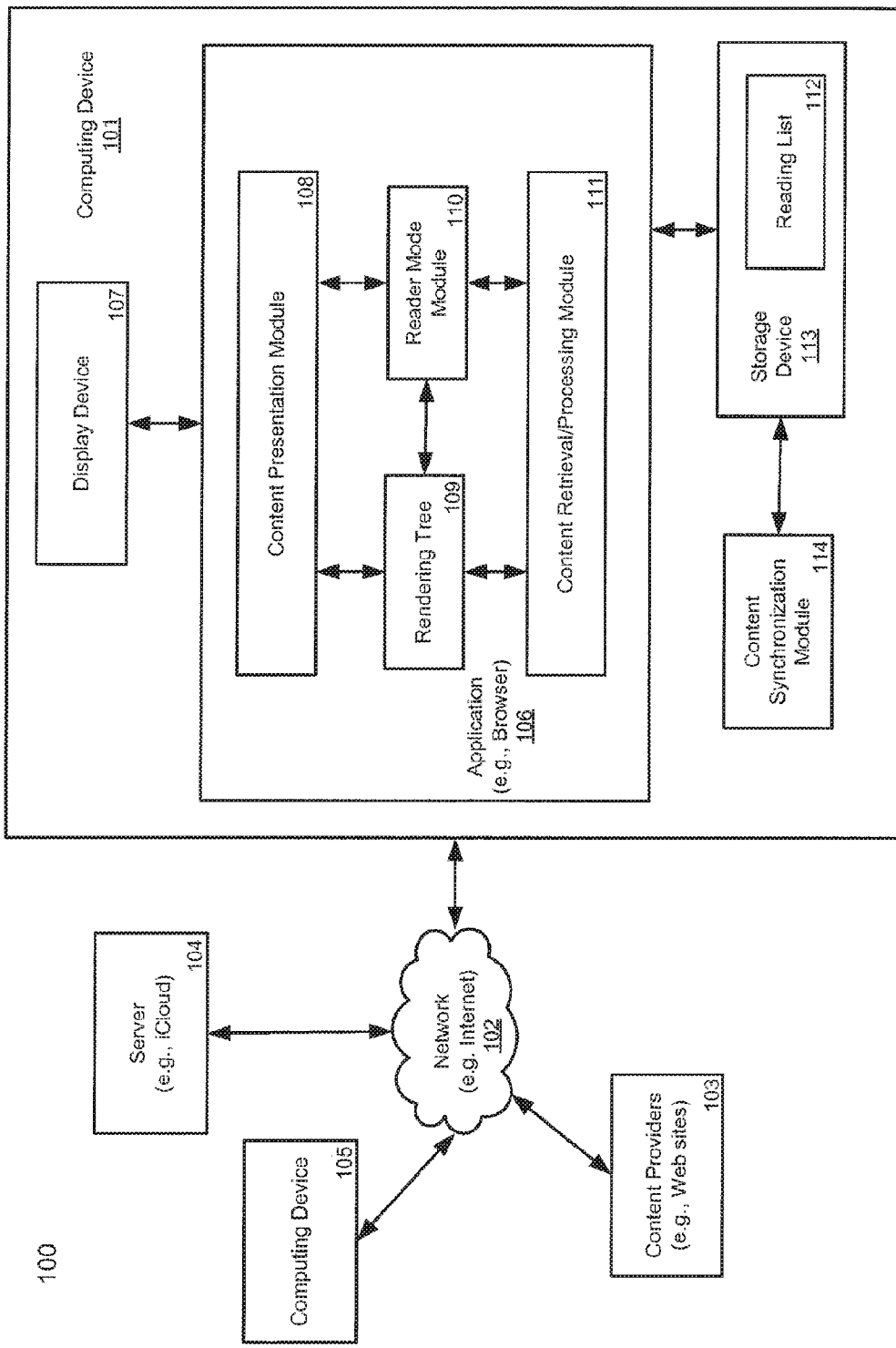
FIG. 1 is a block diagram illustrating a system for managing a reading list of articles according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a graphical user interface (GUI) element is provided to manage articles or documents that can be presented in a reader mode. In one embodiment, a reading list panel is implemented as part of a content viewing application such as a browser application. Throughout this application, a browser application is utilized as an example of a content viewing application; however, other types of content viewing applications can also be applied. According to one embodiment, in response to a user input, the reading list panel is displayed as a sidebar window or an accessory window, for example, associated with or within the same instance of a browser application in which a main window is being displayed. The reading list panel is configured to list one or more article representations representing one or more articles that can be presented in a reader mode.

According to one embodiment, a user can add an article representation associated with a document currently displayed in the main window to the reading list panel by activating or clicking a predetermined button. Alternatively, a user can add an article representation associated with an article embedded within a content or presentation page such as a Web page currently displayed in the main window. That is, the reading list panel is configured to list a list of one or more article representations representing one or more articles or documents (also referred to as a reading list) that can be presented or read in a reader mode. In one embodiment, each article representation listed in the reading list includes enough information identifying the associated article without actual content of the article, such that the actual article can be subsequently retrieved and displayed in a reader mode. In this way, less memory or resource is required to maintain the reading list. In one embodiment, each article representation listed in the reading list panel includes at least one of a title of the article, an address (e.g., universal resource locator or URL) from which the actual article can be retrieved, and an abstract of the article.

Throughout this application, the terms of "article" and "article representation" are interchangeable terms dependent upon the associated context being described. When an article is described or displayed within a reading list panel, it refers to an article representation that represents the actual article. When an article is described or displayed within a main window of the content viewing application, it refers to the actual article.

According to one embodiment, from the reading list panel, a user can browse through the listed articles in a reader mode without having to switch back and forth between the reader mode and a regular or normal mode of presentation. However, if the user decides to disable or inactivate the reader mode, the articles listed in the reading list panel can be browsed through in the normal mode.

According to one embodiment, information (e.g., title, URL, abstract, and icon) of the articles listed in the reading list panel can be stored in a persistent storage location, such that the information can be populated and displayed in the reading list panel when the browser application is launched again subsequently. As a result, a user can continue to read in a reader mode the articles that have been identified and collected in a previous session of the browser application.

According to a further embodiment, the information concerning the articles in the reading list panel can also be stored in the cloud. For example, a user can create a reading list in a first device (e.g., desktop) and the information of the reading list can then be synchronized with a cloud server. Subsequently when the user connects with the cloud server via a second device (e.g., mobile device), the information of the reading list can be synchronized between the cloud server and the second device. When the user launches a browser application from the second device, the reading list is populated in the corresponding reading list panel. As a result, from the second device, the user can "pick up" the articles of the reading list created in the first device.

FIG. 1 is a block diagram illustrating a system for managing a reading list of articles according to one embodiment of the invention. Referring to FIG. 1, system 100 includes computing device 101 communicatively coupled to other devices such as server 104, computing device 105, and content/service provider 103 over network 102. Network 102 can be a local area network (LAN), a wide area network (WAN), or a combination of both. Devices 101 and 105 may be any kind of computing devices, such as, for example, a desktop (e.g., iMac™), a laptop (e.g., MacBook™), a tablet (e.g., iPad™), a mobile phone (e.g., iPhone™), a media device (e.g., iPod™), etc. In one embodiment, device 101 includes, but is not limited to, a browser application 106 executed in a memory by a processor of device 101 to retrieve a content page such as a Web page from a remote Web site or from a remote or local file system, and to present the content page in GUI 107 such as a display device.

In one embodiment, browser application 106 includes content presentation module 108 and content retrieval or processing module 111. Content retrieval module 111 is configured to retrieve a presentation page such as a Web page from a content provider such as Web site 103 and content presentation module 108 is configured to present or display the presentation page on display device 107. Throughout this application, a Web page is utilized as an example of a presentation page and a Web server is utilized as an example of a content provider. Other types of content and servers may also be applied. In one embodiment, when content retrieval module 111 receive a Web page, it parses the Web page to build a rendering tree or data structure 109, where content presentation module 108 is configured to render the Web page based on rendering tree 109 and to display the Web page on the display device. In one embodiment, for each Web page represented by rendering tree 109, reader mode module 110 is configured to determine, based on rendering tree 109, whether the Web page is capable of being displayed or presented in a reader mode.

Rendering tree 109 includes one or more nodes, each representing an object representing an element of the Web page. Some of the nodes may represent articles that are capable of being displayed in the reader mode. In one embodiment, for each of the nodes representing an article, reader mode module 110 is configured to access the article and to detect whether the article is capable of being displayed in the reader mode. Accordingly, the rendering tree 109 may be updated to include an indicator indicating whether a particular article is capable of being displayed in the reader mode. A reader mode refers to a displaying mode in which an article of a Web page is displayed in a manner without other unrelated information, such as, the background color or image, or advertisements that come with the Web page. Further detailed information concerning operations of a reader mode can be found in co-pending U.S. patent application Ser. No. 12/794,674, entitled "Reader Mode Presentation of Web Content," filed Jun. 4, 2010, which is incorporated by reference herein in its entirety.

In one embodiment, a reading list panel is implemented as part of browser application 106. In response to a user input, the reading list panel is displayed by browser application 106 as a sidebar window or an accessory window, for example, associated with or within the same instance of browser application 106 in which a main window is being displayed. For example, a user can activate or click on a graphical representation such as icon from a bookmark bar of a browser application to launch or activate the reading list panel. The reading list panel is configured to list one or more articles that can be presented in a reader mode.

According to one embodiment, a user can add a document currently displayed in the main window to the reading list panel by activating or clicking a predetermined button. Alternatively, a user can add an article embedded within a content page such as a Web page currently displayed in the main window. For example, a user can select a link such as a hypertext link linking with an article embedded within the content page via a keyboard short cut or a combination of one or more keys and/or actions (e.g., shift-click). An article can be added in an animated fashion. That is, the reading list panel contains a list of one or more articles or documents that can be presented or read in a reader mode. Similarly, an article can also be removed from the reading list panel.

In one embodiment, each article representation listed in the reading list includes enough information identifying the article instead of actual content of the article, such that the actual article can be subsequently retrieved and displayed in a reader mode. In one embodiment, each article representation listed in the reading list panel includes at least one of a title of the article, an address (e.g., universal resource locator or URL) from which the actual article can be retrieved, and an abstract of the article. When an article is being added to the reading list, at least a portion of the article is scanned by reader mode module 110 to extract an abstract of the article. In addition, certain metadata such as a title of the article and a URL is also extracted. This information is displayed in the reading list. Further, a graphical representation such as an icon associated with the article can also be extracted and displayed in the reading panel. The image of the graphical representation may also be enhanced from the original one provided by the content provider.

According to one embodiment, from the reading list panel, a user can browse through the listed article in a reader mode without having to switch back and forth between the reader mode and the normal mode of presentation. For example, in response to a selection of an article from the reading list panel, content of the article is retrieved from a content provider based on an address associated with the article, which is retrieved from the corresponding entry of the reading list panel. The retrieved article is then displayed in a reader mode within a main window of the browser application. However, if the user decides to disable or inactivate the reader mode, the articles listed in the reading list panel can be browsed through in the normal mode.

According to one embodiment, information (e.g., title, URL, abstract, and icon) of the articles listed in the reading list panel can be maintained in a system memory of a data processing system in which the corresponding browser application is running. Alternatively, the information of the articles listed in the reading list panel can also be stored in a persistent storage location such as storage device 113 as part of reading list 112, such that the information can be populated and displayed in the reading list panel when browser application 106 is launched again subsequently. As a result, a user can continue to read in a reader mode the articles that have been identified and collected in a previous session of the browser application.

According to a further embodiment, the information concerning the articles in the reading list panel can also be stored in the cloud. That is, the information can be transmitted to and stored (e.g., synchronized) by content synchronization module 114 in cloud server 104 such as iCloud™ available from Apple® Inc. of Cupertino, Calif. For example, a user can create a reading list in a first device (e.g., desktop such as device 101) and the information of the reading list is then synchronized with a cloud server such as server 104. Subsequently when the user connects with the cloud server via a second device (e.g., mobile device such as device 105), the information of the reading list can be synchronized between the cloud server and the second device. When the user launches a browser application from the second device, the reading list is populated in the corresponding reading list panel. As a result, from the second device, the user can "pick up" the articles of the reading list created in the first device.

Furthermore, dependent upon the display capability of the second device, an article capable of being displayed by the first device (e.g., desktop) may or may not be capable of being displayed properly by the second device (e.g., mobile device). According to one embodiment, when a browser application picks up an article of a reading list, the browser application of the second device may search, identify, locate, and/or render a proper version of the article that is suitable for being displayed by the second device.

FIGS. 2A-2D are screenshots illustrating an example of graphical user interfaces of a content viewing application according to some embodiments of the invention. Note the GUI 200 may be described for the purpose of illustration only; other formats or configurations of GUIs can also be implemented. GUI 200 may be rendered and presented by content viewing application 106 of FIG. 1. For example, a content viewing application may be a Safari™ browser application available from Apple Inc., or alternatively, it can be an Internet Explorer™ browser application or a FireFox™ browser application. A browser application can be executed within a variety of operating systems, such as Mac OS™ available from Apple Inc., Windows™ operating system available from Microsoft® Corporation of Redmond, Wash., a LINUX, or a UNIX operating system.

Also note that throughout this application, a browser application and a Web page are used as example of a content viewing application and presentation page to be viewed; however, other applications such as a file system browser (e.g., Finder™ available from Apple Inc. or Windows Explorer™ available from Microsoft) or presentation applications such as a slide presentation application (e.g., PowerPoint™ from Microsoft or Keynote™ from Apple), as well as other presentations such as document files may also be applied herein. In addition, throughout this application, any button or a control of the GUI of a browser application can be activated by clicking the button or control using a pointing device, via one or more keystrokes from a keyboard, a voice interactive command, and/or via a signal received via an application programming interface (API).

Figure 2A:
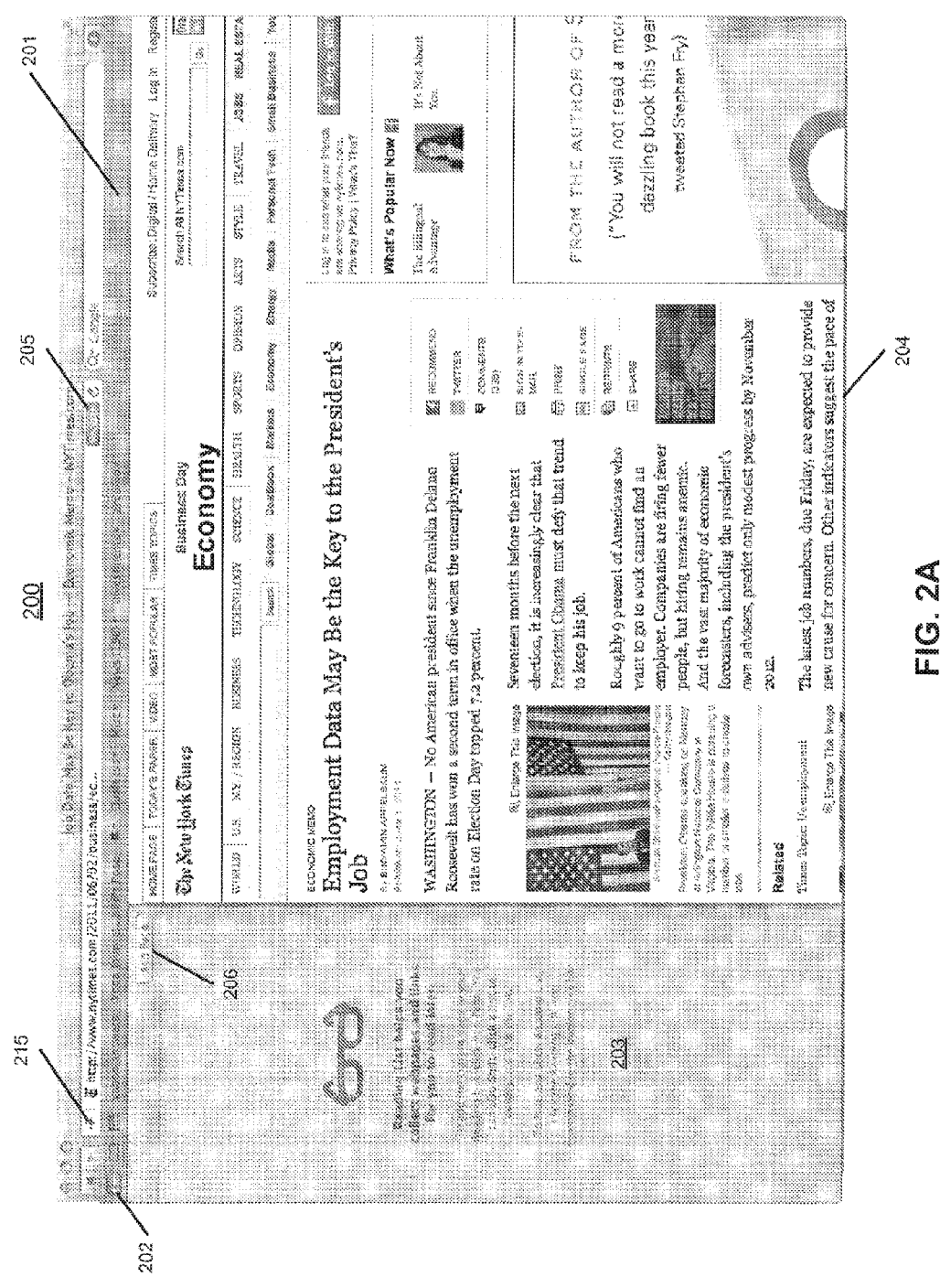

Referring to FIG. 2A, when a browser application is launched and accesses an address (e.g., URL) of a content provider such as a Web site, a Web page is downloaded from the Web site, rendered by the browser application, and presented in main window 204 of browser GUI 200. Web page displayed in main window 204 may or may not be reader mode capable. As described above, a reader mode module (e.g., reader mode module 110) is configured to examine the Web page to determine whether the Web page is capable of being presented in a reader mode, for example, using certain techniques described in the above incorporated-by-reference patent application.

In one embodiment, when the browser application detects that document presented in main window can be presented in a reader mode, a graphical representation such as an icon or a button is displayed to indicate that the Web page currently presented in main window 204 is capable of being presented in a reader mode. In this example, when the Web page of main window 204 is detected to be reader mode capable, button 205 is displayed within a predetermined proximity of address field that stores an address (e.g., URL) from which the currently displayed Web page was retrieved. When button 205 is activated, the Web page is displayed in a reader mode within main window 204, as shown in FIG. 2C in which other unrelated or less related information such as certain advertisement, icons, links, buttons, search field, and/or images of the Web page have been removed to only show the actual content associated with the Web page.

In addition, according to one embodiment, reading list panel (also simply referred to as a reading list) 203 can be displayed as a sidebar window or an accessory window associated with main window 204. Reading list panel 203 can be activated and displayed via button 202, which may be implemented at a variety of position within GUI 200 such as bookmark bar 201 in this example. Reading list panel 203 can also be removed by activating button 202 again. Reading list panel 203 can be used to store a list of articles (also referred to as a reading list) that can be presented in a reader mode.

Figure 2B:
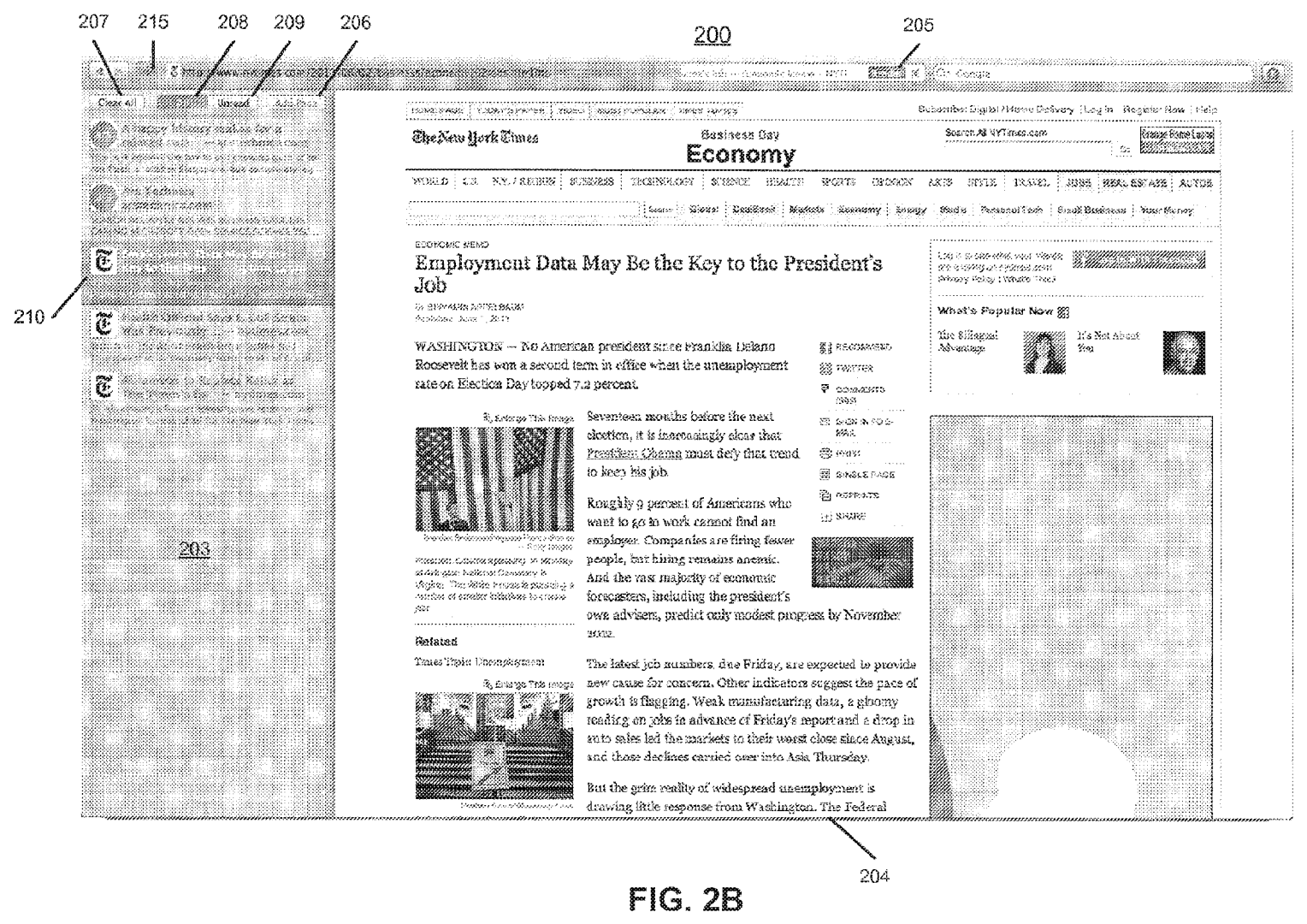
Figure 2C:
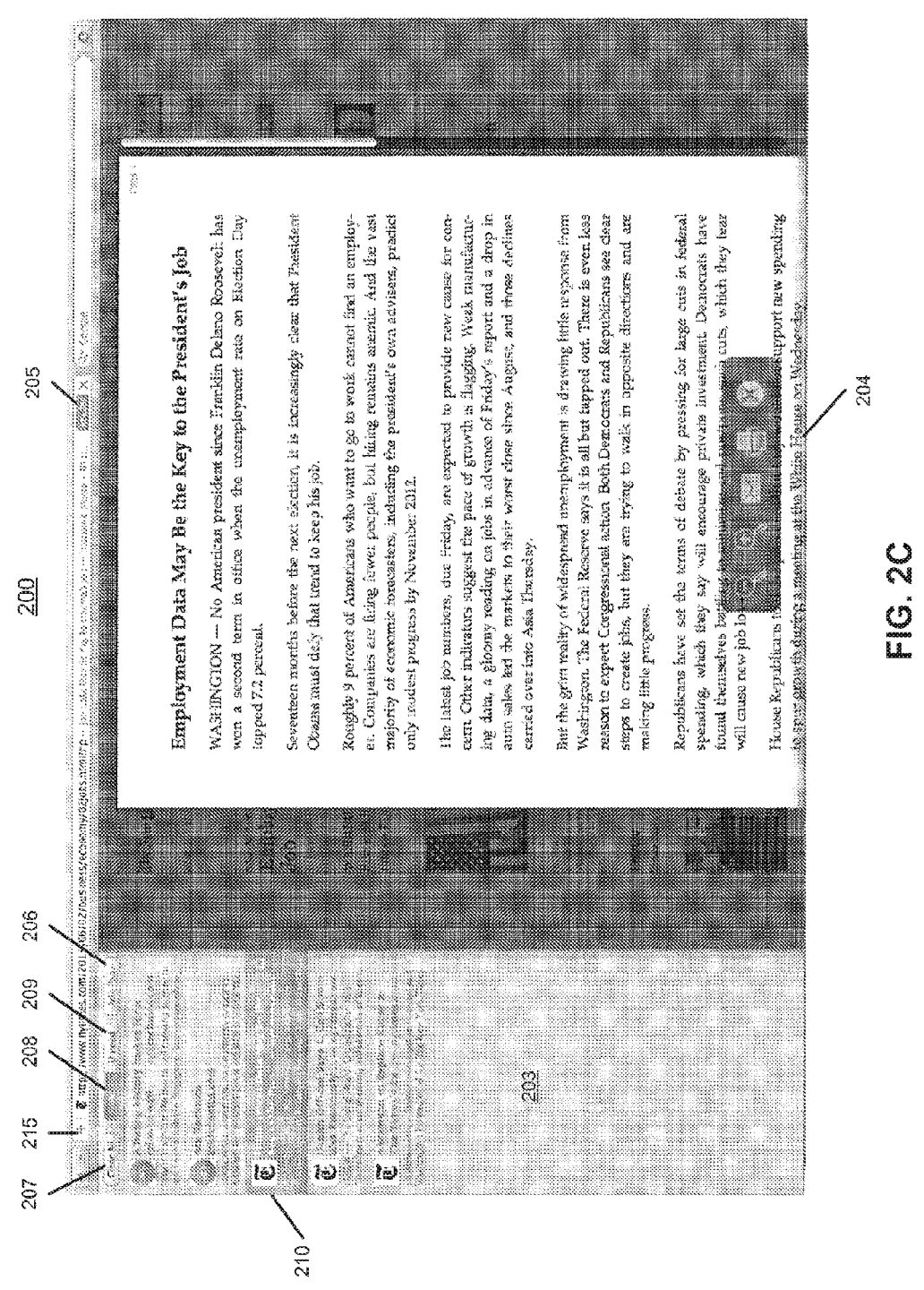
Figure 2D:

According to one embodiment, the Web page currently presented in main window 204 can be added to reading list panel 203, for example, by activating button 206, as shown in FIG. 2B. Referring to FIG. 2B, in this example, the Web page currently displayed in main window 204 is added to reading list panel 203 as article 210. In addition, in response to a user input via button 206, the browser application is configured to examine the Web page currently displayed in main window 204 to extract certain metadata of the Web page. In one embodiment, the browser application extracts at least the title of the Web page and an address such as a URL of the Web page. In addition, the browser application generates an Abstract of the Web page based on at least a portion of the content of the Web page. The metadata and the Abstract are then associated with the corresponding article and presented in reading list panel 203. In this example, article 210 is presented with the associated title, URL, and Abstract. The browser application may further determine or extract a graphical representation such as an icon associated with the Web page. An underlying Web rendering engine associated with the browser application may further enhance the image of the graphical representation, for example, by applying a sharpening filter, etc. The browser application may further craw through a domain of the corresponding Web site to identify or locate another graphical representation with a better resolution to be displayed in reading list panel 203. Note that reading list panel 203 does not have to be activated or displayed when adding an article. An article currently displayed in main window 204 can also be added via button 215 near the address bar when reading list panel is not displayed at the point in time. When button 215 is activated, as shown in FIG. 2D, a dialog box 220 is displayed prompting the user whether the user wishes to add the currently displayed article to the reading list panel.

In addition, an article embedded within the currently displayed Web page can also be added to reading list panel 203. A Web page may contain one or more links such as hypertext links linking with one or more articles that are located at other locations such as remote servers, which can be retrieved by associated links (e.g., URLs). According to one embodiment, a user can add the linked article to reading list panel without having to access the link by performing a predetermined action such as shift-clicking the link. In response to such an action, the browser application is configured to add the underlying article to reading list panel 203. In one embodiment, the browser application is configured to access the link to examine the article, for example, to extract the title, icon, and an abstract of the article as described above, without requiring the user to actually access the link. Alternatively, a user can actually access the link and then add the article to reading list panel by activating button 206.

When a linked article is added to reading list panel without having the user actually open the link, according to one embodiment, the article is added to reading list panel 203 via an animated fashion, for example, by flying or being thrown into reading list panel 203. Note that reading list panel 203 does not have to be activated or displayed when adding an article. An article can be added to the reading list panel 203 by flying or being thrown towards icon 202 instead when reading list panel 203 is not displayed at the point in time.

Referring to FIG. 2C, from reading list panel 203, a user can browse through the articles listed therein. When a user selects any one of the articles from reading list panel 203, the corresponding article is retrieved from the associated URL and displayed in a reader mode in main window 204. In this example, it is assumed that the user selects article 210 from reading list panel 203, and the corresponding article is retrieved from its source based on the associated URL and presented in a reader mode within main window 204. When the user selects a second article from reading list panel 203, the second article is retrieved and displayed in the reader mode within main window 204. Thus, the reader mode remains active among the articles being browsed and displayed without switching back and forth between a reader mode and a normal mode, unless the user specifically disables the reader mode, for example, by clicking button 205, in which case, the articles are to be displayed in a normal mode as shown in FIG. 2B.

In one embodiment, within reading list panel 203, any one of the articles can be removed from reading list panel 203, for example, via a predetermined keystroke such as a delete functional key. All of the articles can also be removed from reading list panel 203 by activating "clear all" button 207. The articles that have not been read or displayed can be listed in an "unread" page by activating tab or page selector 209 or alternatively, all articles can be listed by activating an "all" tab 208. In the "unread" page, when an article has been accessed and displayed, the corresponding article may be removed or grayed out from the "unread" page.

According to one embodiment, information (e.g., title, URL, abstract, and icon) of the articles listed in reading list panel 203 can be stored in a persistent storage location, such that the information can be populated and displayed in reading list panel 203 when the browser application is launched again subsequently. As a result, a user can continue to read in a reader mode the articles that have been identified and collected in a previous session of the browser application.

According to a further embodiment, the information concerning the articles in reading list panel 203 can also be stored in the cloud. For example, a user can create a reading list in a first device (e.g., desktop) and the information of the reading list is then synchronized with a cloud server. Subsequently when the user connects with the cloud server via a second device (e.g., mobile device), the information of the reading list can be synchronized between the cloud server and the second device. When the user launches a browser application from the second device, the reading list is populated in the corresponding reading list panel. As a result, from the second device, the user can "pick up" the articles of the reading list created in the first device.

Furthermore, dependent upon the display capability of the second device, an article capable of being displayed by the first device (e.g., desktop) may not be capable of being displayed properly by the second device (e.g., mobile device). According to one embodiment, when a browser application picks up an article of a reading list, the browser application of the second device may search, identify, locate, and/or render a proper version of the article that is suitable for being displayed by the second device.

Figure 3:
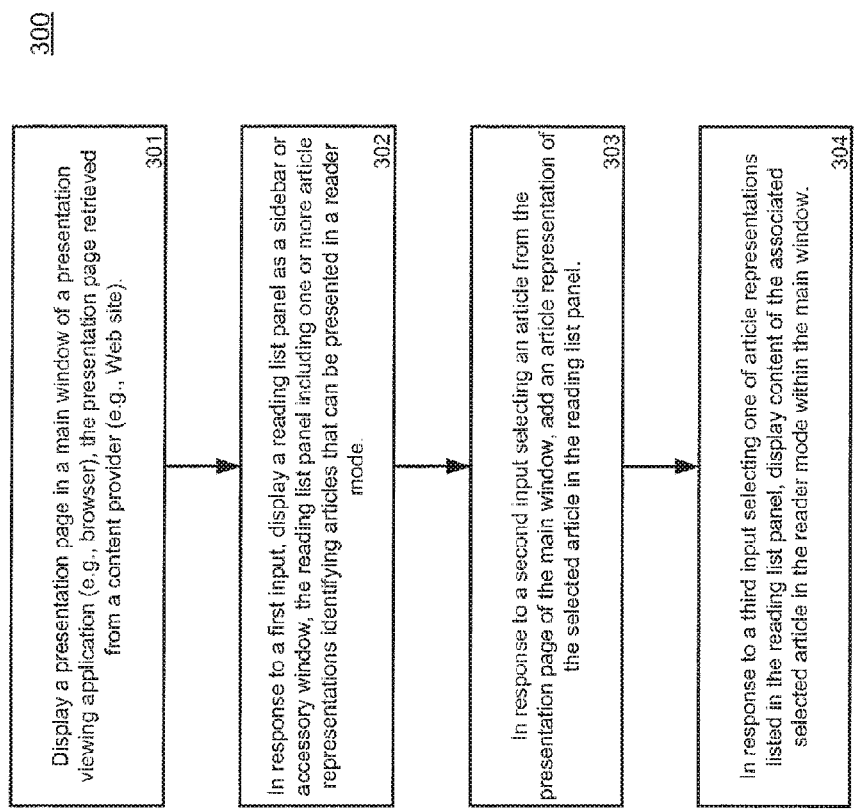
FIG. 3 is a flow diagram illustrating a method for processing articles in a reader mode according to one embodiment of the invention.

FIG. 3 is a flow diagram illustrating a method for processing articles in a reader mode according to one embodiment of the invention. Method 300 may be performed by browser application 106 of FIG. 1. The method may be performed by processing logic which may include software, hardware, or a combination of both. The method may be stored as executable instructions in a machine-readable storage medium and executed in a memory by a processor or processing device. Referring to FIG. 3, at block 301, a presentation page is displayed in a main window of a content viewing application, where the presentation page is retrieved from a content provider. For example, the presentation page may be a Web page or a document page. The content viewing application may be a browser application such as Web browser or a file browser. Content provider may be a remote Web server or a file system. At block 302, in response to a first input (e.g., button 202 of FIG. 2A), a reading list panel is displayed as a sidebar window. The reading list panel includes zero or more articles that can be presented in a reader mode. At block 303, in response to a second input selecting an article from the presentation page displayed in the main window, the selected article is added and displayed in the reading list panel. At block 304, in response to a third input selecting one of the articles from listed in the reading list panel, content of the selected article is retrieved and displayed in the main window of the browser application.

Figure 4:
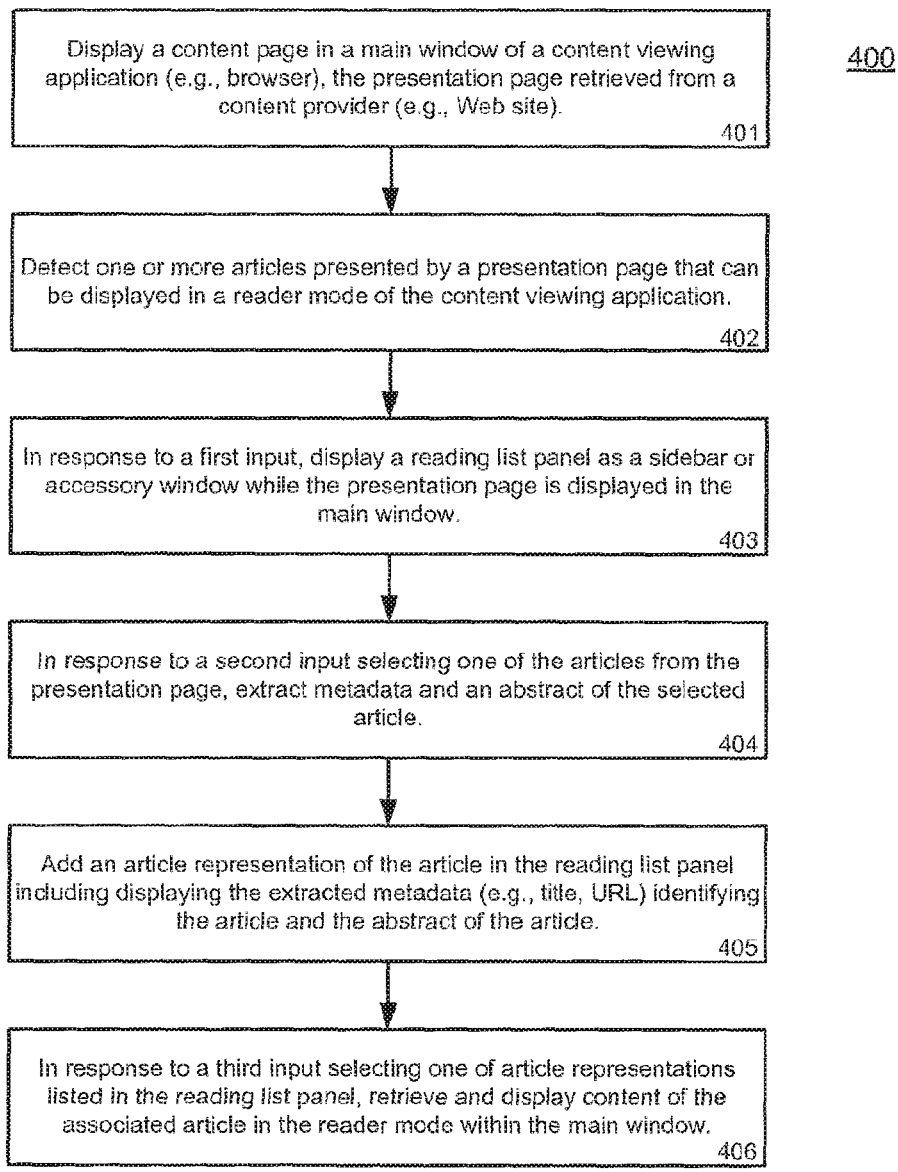
FIG. 4 is a flow diagram illustrating a method for processing articles in a reader mode according to another embodiment of the invention.

FIG. 4 is a flow diagram illustrating a method for processing articles in a reader mode according to another embodiment of the invention. Method 400 may be performed by browser application 106 of FIG. 1. The method may be performed by processing logic which may include software, hardware, or a combination of both. The method may be stored as executable instructions in a machine-readable storage medium and executed in a memory by a processor or processing device. Referring to FIG. 4, at block 401, a presentation page is displayed in a main window of a content viewing application, where the presentation page is retrieved from a content provider. At block 402, one or more articles are detected from the presentation page that are capable of being presented in a reader mode of the content viewing application.

In response to a first input (e.g., via button 202 of FIG. 2A), at block 403, a reading list panel is displayed as a sidebar window while the presentation page is displayed in the main window of the content viewing application. In response to a second input (e.g., shift-click) selecting an article from the presentation page displayed in the main window, at block 404, metadata and abstract of the article are extracted from the selected article. At block 405, the selected article is added to the reading list panel including displaying at least some of the metadata and the abstract of the selected article. At block 406, in response to a third input selecting one of the articles listed in the reading list panel, the selected article is displayed in a reader mode within the main window of the content viewing application.

Figure 5:
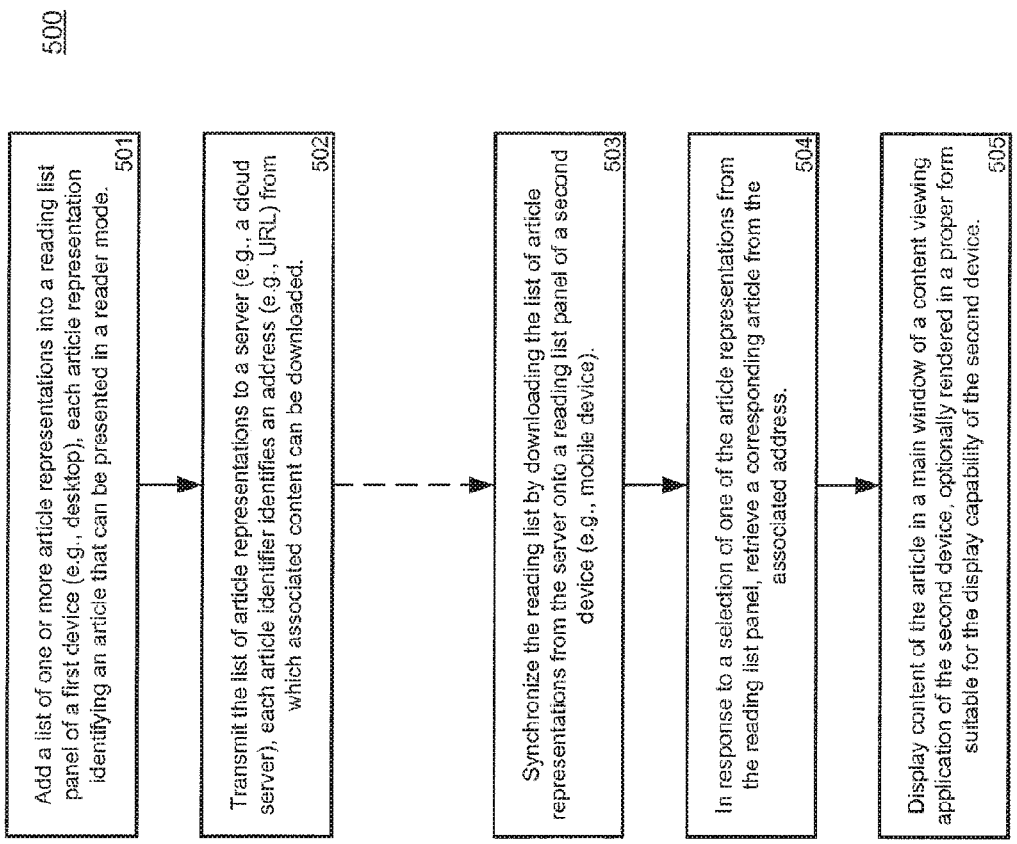
FIG. 5 is a flow diagram illustrating a method for processing articles in a reader mode according to another embodiment of the invention.

FIG. 5 is a flow diagram illustrating a method for processing articles in a reader mode according to another embodiment of the invention. Referring to FIG. 5, at block 501, a list of one or more article representations or identifiers are added to reading list panel of a content viewing application running within a first device (e.g., desktop). Each article representation identifies an article that is capable of being presented in a reader mode of the content viewing application. At block 502, the list of article representations is transmitted or synchronized to a server such as a cloud server. Each article representation includes at least one of a title, an abstract, an address, and an icon, without the actual content of the article. Subsequently, at block 503, the list of article representations is synchronized to a second device from the server and displayed in a reading list panel of a content viewing application running within the second device (e.g., mobile device). At block 504, in response to an input selecting one of the article representations displayed in the reading list panel of the convent viewing application of the second device, content of the article identified by the selected article representation is retrieved from a content provider based on an associated address of the selected article representation and displayed in a main window of the content viewing application. Optionally, the presented content is rendered into a proper form suitable for being displayed by the second device based on the display capability of the second device.

FIG. 6 is a block diagram of a data processing system, which may be used with one embodiment of the invention. For example, the system 600 may be used as part of any of devices or systems 101 and 103-105 as shown in FIG. 1. Note that while FIG. 6 illustrates various components of a computer system, it is not intended to represent any particular architecture or manner of interconnecting the components; as such details are not germane to the present invention. It will also be appreciated that network computers, handheld computers, cell phones and other data processing systems which have fewer components or perhaps more components may also be used with the present invention. The computer system of FIG. 6 may, for example, be an Apple Macintosh computer or MacBook, an IBM compatible PC, or a computer server.

As shown in FIG. 6, the computer system 600, which is a form of a data processing system, includes a bus or interconnect 602 which is coupled to one or more microprocessors 603 and a ROM 607, a volatile RAM 605, and a non-volatile memory 606. The microprocessor 603 is coupled to cache memory 604. The bus 602 interconnects these various components together and also interconnects these components 603, 607, 605, and 606 to a display controller and display device 608, as well as to input/output (I/O) devices 610, which may be mice, keyboards, modems, network interfaces, printers, and other devices which are well-known in the art.

Typically, the input/output devices 610 are coupled to the system through input/output controllers 609. The volatile RAM 605 is typically implemented as dynamic RAM (DRAM) which requires power continuously in order to refresh or maintain the data in the memory. The non-volatile memory 606 is typically a magnetic hard drive, a magnetic optical drive, an optical drive, or a DVD RAM or other type of memory system which maintains data even after power is removed from the system. Typically, the non-volatile memory will also be a random access memory, although this is not required.

While FIG. 6 shows that the non-volatile memory is a local device coupled directly to the rest of the components in the data processing system, the present invention may utilize a non-volatile memory which is remote from the system; such as, a network storage device which is coupled to the data processing system through a network interface such as a modem or Ethernet interface. The bus 602 may include one or more buses connected to each other through various bridges, controllers, and/or adapters, as is well-known in the art. In one embodiment, the I/O controller 609 includes a USB (Universal Serial Bus) adapter for controlling USB peripherals. Alternatively, I/O controller 609 may include an IEEE-1394 adapter, also known as FireWire adapter, for controlling FireWire devices.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A non-transitory computer-readable storage medium storing one or more programs, the one or more programs comprising instructions which, when executed by an electronic device with a display and one or more input devices, cause the electronic device to:
   obtain information for rendering a webpage that includes content and other information that is distinct from the content, wherein the webpage is capable of being displayed in a plurality of modes of presentation including:
      a normal mode of presentation in which the content is displayed concurrently with the other information, and
      a reader mode of presentation in which the content is displayed without displaying the other information;
   after obtaining information for rendering the webpage, display, on the display, at least a portion of the webpage wherein the webpage is displayed in the normal mode of presentation;
   while the webpage is displayed on the display in the normal mode of presentation, receive, via the one or more input devices, a first input that corresponds to a request to add the webpage to a reading list;
   in response to receiving the first input, add the webpage to the reading list;
   after adding the webpage to the reading list, while displaying the reading list, receive a second input that corresponds to selection of a representation of the webpage from the reading list; and
   in response to receiving the second input, display the webpage on the display in the reader mode of presentation.

2. The non-transitory computer-readable storage medium of claim 1, wherein the one or more programs further comprise instructions which, when executed by the electronic device, cause the electronic device to: detect selection of a different webpage from the reading list and, in response to detecting the selection, display the different webpage on the display in the reader mode of presentation.

3. The non-transitory computer-readable storage medium of claim 1, wherein adding the webpage to the reading list includes extracting a title from the webpage and generating the representation of the webpage for display in the reading list, the representation including the extracted title.

4. The non-transitory computer-readable storage medium of claim 1, wherein adding the webpage to the reading list includes identifying an icon that is associated with the webpage and generating the representation of the webpage for display in the reading list, the representation including the identified icon.

5. The non-transitory computer-readable storage medium of claim 4, wherein identifying the icon includes extracting an image from the webpage.

6. The non-transitory computer-readable storage medium of claim 4, wherein identifying the icon includes retrieving an image that is associated with the webpage and enhancing the retrieved image.

7. The non-transitory computer-readable storage medium of claim 1, wherein adding the webpage to the reading list includes obtaining an abstract of the webpage and generating the representation of the webpage for display in the reading list, the representation including the obtained abstract.

8. The non-transitory computer-readable storage medium of claim 7, wherein obtaining the abstract of the webpage includes generating the abstract based on an analysis of the content.

9. The non-transitory computer-readable storage medium of claim 1, wherein displaying the webpage on the display in the reader mode of presentation includes continuing to display the reading list.

10. The non-transitory computer-readable storage medium of claim 1, wherein the reading list includes at least one webpage that was added to the reading list using a separate electronic device that is distinct from the electronic device.

11. The non-transitory computer-readable storage medium of claim 1, wherein the one or more programs further comprise instructions which, when executed by the electronic device, cause the electronic device to: after adding the webpage to the reading list, synchronize the reading list between the electronic device and a remote device distinct from the electronic device.

12. The non-transitory computer-readable storage medium of claim 1, wherein the webpage includes a link to an additional webpage that is capable of being displayed in the plurality of modes of presentation, and the one or more programs further comprise instructions which, when executed by the electronic device, cause the electronic device to:
   receive a third input that corresponds to a request to add the additional webpage to the reading list without rendering the additional webpage and, in response to receiving the third input, add the additional webpage to the reading list.

13. The non-transitory computer-readable storage medium of claim 12, wherein adding the additional webpage to the reading list includes displaying on the display an animation of a representation of the additional webpage flying towards the reading list.

14. The non-transitory computer-readable storage medium of claim 12, wherein adding the additional webpage to the reading list includes displaying on the display an animation of a representation of the additional webpage flying towards an icon that is associated with the reading list.

15. The non-transitory computer-readable storage medium of claim 12, wherein the third input corresponds to shift-clicking the link to the additional webpage.

16. The non-transitory computer-readable storage medium of claim 1, wherein the reading list is displayed in a sidebar window that is adjacent to a main window in which the webpage is displayed in the reader mode of presentation.

17. An electronic device, comprising:
a display;
one or more processors;
one or more input devices;
memory; and
one or more programs, wherein the one or more programs are stored in the memory and configured to be executed by the one or more processors, the one or more programs including instructions for:
  obtaining information for rendering a webpage that includes content and other information that is distinct from the content, wherein the webpage is capable of being displayed in a plurality of modes of presentation including:
    a normal mode of presentation in which the content is displayed concurrently with the other information, and
    a reader mode of presentation in which the content is displayed without displaying the other information;
  after obtaining information for rendering the webpage, displaying, on the display, at least a portion of the webpage wherein the webpage is displayed in the normal mode of presentation;
  while the webpage is displayed on the display in the normal mode of presentation, receiving, via the one or more input devices, a first input that corresponds to a request to add the webpage to a reading list;
  in response to receiving the first input, adding the webpage to the reading list;
  after adding the webpage to the reading list, while displaying the reading list, receiving a second input that corresponds to selection of a representation of the webpage from the reading list; and
  in response to receiving the second input, displaying the webpage on the display in the reader mode of presentation.

18. The electronic device of claim 17, wherein the one or more programs further comprise instructions which, when executed by the one or more processors, cause the electronic device to: detect selection of a different webpage from the reading list and, in response to detecting the selection, display the different webpage on the display in the reader mode of presentation.

19. The electronic device of claim 17, wherein adding the webpage to the reading list includes extracting a title from the webpage and generating the representation of the webpage for display in the reading list, the representation including the extracted title.

20. The electronic device of claim 17, wherein adding the webpage to the reading list includes identifying an icon that is associated with the webpage and generating the representation of the webpage for display in the reading list, the representation including the identified icon.

21. A method, comprising:
at an electronic device with a display and one or more input devices:
  obtaining information for rendering a webpage that includes content and other information that is distinct from the content, wherein the webpage is capable of being displayed in a plurality of modes of presentation including:
    a normal mode of presentation in which the content is displayed concurrently with the other information, and
    a reader mode of presentation in which the content is displayed without displaying the other information;
  after obtaining information for rendering the webpage, displaying, on the display, at least a portion of the webpage wherein the webpage is displayed in the normal mode of presentation;
  while the webpage is displayed on the display in the normal mode of presentation, receiving, via the one or more input devices, a first input that corresponds to a request to add the webpage to a reading list;
  in response to receiving the first input, adding the webpage to the reading list;
  after adding the webpage to the reading list, while displaying the reading list, receiving a second input that corresponds to selection of a representation of the webpage from the reading list; and
  in response to receiving the second input, displaying the webpage on the display in the reader mode of presentation.

22. The method of claim 21, further comprising: detecting selection of a different webpage from the reading list and, in response to detecting the selection, displaying the different webpage on the display in the reader mode of presentation.

23. The method of claim 21, wherein adding the webpage to the reading list includes extracting a title from the webpage and generating the representation of the webpage for display in the reading list, the representation including the extracted title.

24. The method of claim 21, wherein adding the webpage to the reading list includes identifying an icon that is associated with the webpage and generating the representation of the webpage for display in the reading list, the representation including the identified icon.

25. The method of claim 21, wherein adding the webpage to the reading list includes obtaining an abstract of the webpage and generating the representation of the webpage for display in the reading list, the representation including the obtained abstract.

26. The method of claim 21, further comprising: after adding the webpage to the reading list, synchronizing the reading list between the electronic device and a remote device distinct from the electronic device.

27. The method of claim 21, wherein the webpage includes a link to an additional webpage that is capable of being displayed in the plurality of modes of presentation, and the method further comprises:
  receiving a third input that corresponds to a request to add the additional webpage to the reading list without rendering the additional webpage and, in response to receiving the third input, adding the additional webpage to the reading list.

28. The method of claim 27, wherein adding the additional webpage to the reading list includes displaying on the display an animation of a representation of the additional webpage flying towards the reading list.

29. The electronic device of claim 17, wherein adding the webpage to the reading list includes obtaining an abstract of the webpage and generating the representation of the webpage for display in the reading list, the representation including the obtained abstract.

30. The electronic device of claim 17, wherein the one or more programs further comprise instructions which, when executed by the one or more processors, cause the electronic device to: after adding the webpage to the reading list, synchronize the reading list between the electronic device and a remote device distinct from the electronic device.

31. The electronic device of claim 17, wherein the webpage includes a link to an additional webpage that is capable of being displayed in the plurality of modes of presentation, and the one or more programs further comprise instructions which, when executed by the one or more processors, cause the electronic device to:

receive a third input that corresponds to a request to add the additional webpage to the reading list without rendering the additional webpage and, in response to receiving the third input, add the additional webpage to the reading list.

32. The electronic device of claim 31, wherein adding the additional webpage to the reading list includes displaying on the display an animation of a representation of the additional webpage flying towards the reading list.

\* \* \* \* \*